United States Patent [19]

Kagami et al.

[11] 4,277,388

[45] Jul. 7, 1981

[54] THERMOPLASTIC RESIN OF HYDROLYZED PRODUCT OF VINYL CHLORIDE COPOLYMER FOR USE IN COATING RESIN AND PROCESS FOR PREPARING SUCH RESIN

[75] Inventors: Toshio Kagami; Yoshijiro Saito; Shigeru Matsushita; Kunio Iriuchijima, all of Shibukawa, Japan

[73] Assignee: Denki Kagaku Kogyo Kabushiki Kaisha, Japan

[21] Appl. No.: 79,862

[22] Filed: Sep. 28, 1979

Related U.S. Application Data

[63] Continuation-in-part of Ser. No. 24,764, Mar. 28, 1979, abandoned.

[51] Int. Cl.³ ................................................. C08F 8/12
[52] U.S. Cl. .......................... 260/33.4 R; 260/31.2 R; 260/31.2 N; 260/32.8 R; 260/32.8 N; 260/33.6 UA; 360/134; 428/442; 525/58; 525/60; 525/61; 525/62
[58] Field of Search ............................ 525/60, 61, 62; 260/33.4 R

[56] References Cited

U.S. PATENT DOCUMENTS

| 2,512,726 | 6/1950 | Penn et al. | 526/8 |
| 3,021,318 | 2/1962 | Laporta | 526/8 |

FOREIGN PATENT DOCUMENTS

862,978  3/1961  United Kingdom.

Primary Examiner—Stanford M. Levin
Attorney, Agent, or Firm—Paul J. Sutton

[57] ABSTRACT

According to the invention there are provided a thermoplastic resin for use in a coating resin, and a process for preparing such resin, said thermoplastic resin being a hydrolyzed product of a vinyl chloride copolymer obtained by polymerizing 50 to 80% by weight of a vinyl chloride monomer, 20 to 40% by weight of a vinyl ester monomer and 0 to 15% by weight of a comonomer polymerizable with the vinyl chloride monomer, said vinyl chloride copolymer having an average polymerization degree of 200 to 800 and said hydrolyzed product having an absorption ratio of OH/CH in the infrared absorption spectrum of from 0.5 to 0.9.

11 Claims, No Drawings

THERMOPLASTIC RESIN OF HYDROLYZED PRODUCT OF VINYL CHLORIDE COPOLYMER FOR USE IN COATING RESIN AND PROCESS FOR PREPARING SUCH RESIN

CROSS-REFERENCE TO RELATED APPLICATION

This application is a continuation-in-part of application Ser. No. 24,764 filed Mar. 28, 1979, abandoned.

BACKGROUND OF THE INVENTION

1. Field of the Invention

This invention relates to a thermoplastic resin for use in a coating resin to be coated on a base film to produce a magnetic recording tape, and more particularly to a thermoplastic resin which is a hydrolyzed product of vinyl chloride copolymer and a process for preparing such thermoplastic resin.

2. Prior Art

In the production of a magnetic recording tape, it is a known practice to mix a thermoplastic resin with a thermosetting resin to prepare a coating resin which is admixed with magnetic powders and then coated on a base film for the magnetic recording tape. As one example of the thermoplastic resin commonly used in such coating resin, there is known a hydrolyzed product of vinyl chloride copolymer having an average polymerization degree of from 400 to 500 said hydrolyzed product comprising 91% by weight of vinyl chloride, 3% by weight of vinyl acetate and 6% by weight of vinyl alcohol. Since the coating resin containing this known hydrolyzed product of vinyl chloride copolymer is inferior in elongation or covering power, it is unsatisfactory for use as the coating resin to be coated on a base film for producing a magnetic recording tape. Moreover, this prior art coating resin has a disadvantage in that magnetic powders can not be dispersed therein sufficiently uniformly to result in inferior reproducing power in high-frequency zone. Furthermore, it is poor in abrasion-proof property, adhesive power to the base film and durability such as physical strength, and thus fails to give a satisfactory magnetic recording tape.

OBJECTS AND SUMMARY OF THE INVENTION

An object of the present invention is to provide a thermoplastic resin which is a hydrolyzed product of vinylchloride copolymer from which a coating resin having high elongation or covering power can be produced, and to provide a process for preparing such thermoplastic resin.

Another object of the present invention is to provide a thermoplastic resin which is a hydrolyzed product of vinyl chloride copolymer suited for use in a coating resin in which magnetic powders can be uniformly dispersed so as to give a magnetic recording tape excellent in reproducing power in high-frequency zone, and to provide a process for preparing such thermoplastic resin.

A further object of the invention is to provide a thermoplastic resin which is a hydrolyzed product of vinyl chloride copolymer capable of giving a coating resin which is excellent in abrasion-proof property, adhesive power to the base film and durability such as physical strength, and to provide a process for preparing such thermoplastic resin.

A further object of the present invention is to provide a thermoplastic resin which is a hydrolyzed product of vinyl chloride copolymer which is readily miscible with the thermosetting resin, and to provide a process for preparing such thermoplastic resin.

The above and other objects of the invention will become apparent from the following description.

According to the present invention, there is provided a thermoplastic resin for use in a coating resin, said thermoplastic resin being a hydrolyzed product of a vinyl chloride copolymer obtained by polymerizing 50 to 80% by weight of a vinyl chloride monomer, 20 to 40% by weight of a vinyl ester monomer and 0 to 15% by weight of a comonomer polymerizable with the vinyl chloride monomer, said vinyl chloride copolymer having an average polymerization degree of 200 to 800 and said hydrolyzed product having an absorption ratio of OH/CH in the infrared absorption spectrum of from 0.5 to 0.9.

According to another aspect of the present invention, there is also provided a process for preparing a thermoplastic resin for use in a coating resin which comprises: copolymerizing 50 to 80% by weight of a vinyl chloride monomer, 20 to 40% by weight of a vinyl ester monomer and 0 to 15% by weight of a comonomer polymerizable with the vinyl chloride monomer to obtain a vinyl chloride copolymer having an average polymerization degree of 200 to 800; hydrolyzing said vinyl chloride copolymer dissolved in a solvent in the presence of an alcohol until the absorption ratio of OH/CH of the hydrolyzed product in the infrared absorption spectrum reaches 0.5 to 0.9; decoloring the hydrolyzed product; and cooling and neutralizing the solution containing the hydrolyzed product of said vinyl chloride copolymer.

DESCRIPTION OF THE INVENTION

The vinyl chloride copolymer used in the present invention as a starting material for the thermoplastic resin component to be admixed with a thermosetting resin to produce a coating resin for a magnetic recording tape shall have a polymerization degree within the range of from 200 to 800, preferably from 300 to 500, and may be obtained by copolymerizing 50 to 80%, preferably 65 to 80%, by weight of a vinyl chloride monomer with 20 and 40%, preferably 20 to 35%, by weight of a vinyl ester monomer and 0 to 15% by weight of another comonomer polymerizable with the vinyl chloride monomer.

According to the most important aspect of the present invention, said vinyl chloride comonomer is hydrolyzed so that the hydrolyzed product of said vinyl chloride copolymer has an absorption ratio of OH/CH in the infrared absorption spectrum of from 0.5 to 0.9. The absorption ratio of OH/CH in the infrared absorption spectrum referred to throughout the specification and claims means the ratio of the absorption at 3450 cm$^{-1}$ due to the OH group to the absorption at 2930 cm$^{-1}$ due to the CH group.

It is a surprising finding that the hydrolyzed product of said vinyl chloride copolymer of the present invention having an absorption ratio of OH/CH in the infrared absorption spectrum of from 0.5 to 0.9 is greatly improved in its miscibility with the thermosetting resin component of a coating resin. When the hydrolyzed product of the vinyl chloride copolymer having the specific absorption ratio in the infrared absorption spectrum as defined above is used to produce a coating resin, magnetic powders can be sufficiently uniformly dispersed to form a coating resin excellent in reproducing power in high-frequency zone and also the durability such as physical strength can be greatly improved. Yet a further advantage of the hydrolyzed product of the vinyl chloride copolymer according to the present invention is that the elongation percentage of the coating resin is remarkably increased, hence leading to improvement in covering power.

In this connection, the elongation percentage of a coating resin containing a hydrolyzed product of the vinyl chloride copolymer having an absorption ratio of OH/CH in the infrared absorption spectrum of less than 0.5 is short of 5%, whereas that of a coating resin containing a hydrolyzed product of the vinyl chloride copolymer having an absorption ratio of OH/CH in the infrared absorption spectrum of 0.5 or more is increased to about 10 to 20% to give a coating resin of excellent property. On the other hand, when a hydrolyzed product of vinyl chloride copolymer having an absorption ratio of OH/CH as defined above of more than 0.9 is used to form a coating resin, the hydrolyzed product reacts with the thermosetting resin such as urethane too rapidly, thus causing gelatinization. For this reason such hydrolyzed product cannot be practically used.

As has been described hereinbefore, in the preparation of the vinyl chloride copolymer, 50 to 80%, preferably 65 to 80%, by weight of the vinyl chloride monomer is copolymerized with the balance of other copolymerizable monomers. If the content of the vinyl chloride monomer is less than 50% by weight, the waterproof property of the resultant resin is deteriorated. On the contrary, if the content of the vinyl chloride monomer exceeds 80%, the resultant copolymer is hardly hydrolyzed to result in inferior physical properties of the final coating resin.

Preferable vinyl ester monomers to be copolymerized with the vinyl chloride monomer to form the vinyl chloride copolymer of the invention include vinyl esters of alkyl carboxylic acids having 2 or more carbon atoms, the examples of such vinyl ester monomers being vinyl acetate and vinyl propionate.

The comonomer other than the vinyl ester monomer preferably used in the present invention may be any of the comonomers capable of copolymerizing with the vinyl chloride monomer and of giving hydrolyzed products having the above defined range of absorption ratio of OH/CH in the infrared absorption spectrum. Examples of such comonomers include methacrylic acid and esters thereof, acrylic acid and esters thereof, maleic acid, fumaric acid, acrylonitrile, vinylidene chloride and α-olefin having 2 to 9 carbon atoms, e.g. ethylene or propylene.

In the preparation of the vinyl chloride copolymer according to the invention, the content of the vinyl ester monomer shall be more than 20% by weight. If the content of the vinyl ester monomer is short of 20% by weight, the absorption ratio of OH/CH in the infrared absorption spectrum of the hydrolyzed product of the resultant copolymer cannot reach higher than 0.5 with the attendant disadvantage that the miscibility of the hydrolyzed product with the thermosetting resin such as polyurethane resin is lowered to render the coating resin, i.e. the admixture of the hydrolyzed product of the vinyl chloride copolymer and the thermosetting resin, to become cloudy and subsequently to hinder the admixture from uniformly setting. On the other hand, the content of the vinyl ester monomer shall not exceed 40% by weight for the reason that the hydrolyzed product of the resultant vinyl chloride copolymer will have an absorption ratio of OH/CH in the infrared absorption spectrum of more than 0.9 if the content of the vinyl ester monomer is in excess of 40% by weight. As specified hereinabove, such hydrolyzed product will cause gelatinization.

In case where one or more comonomers other than the vinyl ester monomer is used, the content thereof shall be less than 15%, since the resultant copolymer becomes hardly hydrolyzed to result in deterioration of the physical properties of the final coating resin.

Further, the average polymerization degree of the vinyl chloride copolymer shall be higher than 200 and lower than 800. If the polymerization degree is lower than 200, the coating resin containing such copolymer when coated on a base film is inferior in strength and tends to shrink disadvantageously. On the contrary, if the polymerization is proceeded so high as the average polymerization degree reaches higher than 800, the elongation percentage of the coating resin containing such copolymer is decreased and the properties of the coating film are deteriorated.

As will be clear from the foregoing detailed description, the thermoplastic resin according to the invention is a vinyl chloride copolymer which can be miscible with or has a good chemical affinity with a thermosetting resin to form a coating resin for use as a matrix resin of a magnetic recording coating. Also, the thermoplastic resin of the invention will not gelatinize when mixed with the thermosetting resin.

The process for preparing the thermoplastic resin according to the invention will now be described hereinbelow.

Firstly, the vinyl chloride monomer is added with a vinyl ester monomer together with or without a copolymerizable comonomer, for example vinyl acetate and methacrylic acid, at a ratio as defined hereinabove and in the appended claims, and then copolymerized to obtain a vinyl chloride copolymer. This copolymer is then dissolved in an organic solvent to form a 10 to 40%, preferably 15 to 35%, by weight solution thereof. As the organic solvent, there may be used ketones such as methyl ethyl ketone or methyl isobutyl ketone, acetic esters such as ethyl acetate or butyl acetate or a mixed solvent thereof with, aromatic compounds such as toluene or xylene. Subsequently the copolymer is hydrolyed by the use of a catalyst and in the presence of an alcohol. Any alcohols may be used in this step provided that the hydrolysis reaction takes place. Examples of the generally usable alcohols include methyl alcohol, ethyl alcohol and butyl alcohol. Although the amount of the alcohol to be used is not limited, preferably 50 to 200 parts by weight of alcohol is added to 100 parts by weight of vinyl chloride copolymer.

It is preferred that a catalyst is used in this hydrolysis step. Any acids or alkalies may be used as such catalyst. However, it is desirous that the catalyst does not contain metallic ion or ammonium ion. For this reason, preferred hydrolysis catalysts are acids, particularly strong acids such as hydrochloric acid, sulfuric acid and phosphoric acid. Among them, hydrochloric acid is the most preferred, since the dispersibility for magnetic powders, the stability against heat and the water-proof property of the coating resin for the magnetic recording tape can be improved when the coating resin contains the hydrolyzed product obtained by hydrolyzing the vinyl chloride copolymer with the use of a strong acid, particularly hydrochloric acid.

The added quantity of the catalyst is not limited and may be determined properly so as to proceed the hydrolysis reaction. For example, if hydrochloric acid is used, generally preferable quantity of the added pure hydrochloric acid ranges about 2 to 5 parts by weight based on 100 parts by weight of the vinyl chloride copolymer.

In the process of the present invention, an alcohol and an acid may be added concurrently similarly as in the common practice adopted in similar hydrolysis steps, but they are not essentially added concurrently and may be added separately as desired.

The hydrolysis may be effected at any desired temperature provided that the absorption ratio of OH/CH in the infrared absorption spectrum of the hydrolyzed product reaches 0.5 to 0.9. However, if the reaction temperature is too low, the required reaction time is redundantly prolonged. On the other hand, if the reaction temperature is too high, the hydrolysis reaction speed becomes to high to make it difficult to control the reaction. Accordingly, the hydrolysis may be effected preferably at 40° C. to 70° C.

When the absorption ratio of OH/CH in the infrared absorption spectrum of the hydrolyzed product reaches 0.5 to 0.9, the hydrolysis reaction is stopped by cooling the reaction solution to room temperature. The required reaction time is changed depending on the factors affecting the reaction speed including the reaction temperature, and not particularly limited. The reaction time required for bringing the absorption ratio of OH/CH to the range as defined according to the present invention under the conditions as mentioned above may be about 40 to 50 hours.

After hydrolyzing the vinyl chloride copolymer to the desired range, the hydrolyzed product is decolored generally by blowing a halogen gas such as chlorine gas into the reaction solution. Alternatively, the hydrolyzed product may be decolored by adding 1 to 2 parts of an organic peroxide such as benzoyl peroxide to the solution containing 100 parts by weight of the hydrolyzed product and maintaining the solution at 40° C. to 70° C. for 3 to 4 hours. By this decolorization treatment, the blackish brown solution of the resultant hydrolyzed product is decolored to become a slightly yellowish colored solution. In this decolorization step, it is important that decoloring agents which do not give adverse affects to the properties of the final products should be used.

After decolorization, the hydrolyzed product is cooled and then the acid present in the solution is neutralized with an organic oxide such as propylene oxide or butylene oxide. The amount of the organic oxide to be added may be in excess of equivalent mole to that of the acid used, for example 1.5 times mole. In this neutralization step, it is important that neutralizing agents such as alkali should not be used since alkali will form salts with acids which salts will adversely affect the compatibility with the thermosetting resin.

When the hydrolyzed product is used in the form of a solution, the alcohol present in the solution is removed by distillation under reduced pressure, whereby the solution free from alcohol is ready for use. When removing the alcohol, it is desirous that the alcohol be removed without heating, preferably under a pressure of 50 to 200 Torr at 40° C. to 70° C. Alcohols shall be removed before the thermoplastic resin is admixed with the thermosetting resin, i.e. generally urethane, since the alcohol reacts with the —NCO group of the urethane to gelatinize the same if a large amount of alcohol is contained in the solution of the hydrolyzed product of the vinyl chloride copolymer. Moreover, if residual alcohol is present in the solution of the hydrolyzed product of the vinyl chloride copolymer, the physical properties of the final coating resin applied on the base film are impaired. It is, therefore, preferred that alcohols in the solution of the hydrolyzed product of the vinyl chloride copolymer be removed such that the residual content in the solution is less than 1% by weight.

If it is desired to use the hydrolyzed product of the vinyl chloride copolymer according to the present invention in the form of powders, the hydrolyzed product may be easily precipitated by adding a large amount of an alcohol which is a non-solvent for the hydrolyzed product. The examples of such alcohols are methyl alcohol, ethyl alcohol, n-propyl alcohol and iso-propyl alcohol. In general, five times or more as the volume of the solution of said hydrolyzed product may be added. Then, the hydrolyzed product thus precipitated is separated by a centifugal separator and dried. Any of the commonly employed drying methods may be employed in the present invention, the representative methods being drying by air and drying under reduced pressure. Anyway, it is preferred that the content of alcohol remaining in the dried powder of hydrolyzed product of the vinyl chloride copolymer be less than 3% by weight since the residual alcohol, if present, tends to react with urethane used as the thermosetting resin component and to gelatinize the same if more than 3% by weight of alcohol is present in the dried powders.

When mixing the hydrolyzed product of the invention with the thermosetting resin such as urethane, the urethane dissolved in a solvent such as ethyl acetate may be merely mixed at room temperature with the hydrolyzed product of the invention if the hydrolyzed product is prepared in the form of a solution. If, on the contrary, the hydrolyzed product is prepared in the form of powders, it may be dissolved in a solvent such as ketones, esters or a mixture with aromatic hydrocarbons and then mixed with the urethane. In general, the coating resin may comprise 20 to 80 parts by weight of the hydrolyzed product of the vinyl chloride copolymer and the reminder of the urethane although the mixing ratio is not critically limited. The coating resin may be generally mixed in an amount of 10 to 50 parts by weight relative to 100 parts by weight of magnetic powders.

EXAMPLES OF THE INVENTION

The present invention will now be described in detail with reference to examples thereof.

EXAMPLE 1

Vinyl chloride copolymers having an average polymerization degree of 400 and prepared from mixtures mainly composed of vinyl chloride monomer and vinyl acetate monomer mixed at the ratios as set forth in the following Table I were dissolved in a mixed solvent of methyl isobutyl ketone, toluol and methyl alcohol to obtain 25% by weight solutions respectively of the copolymers. To each of the solution was added 38% hydrochloric acid solution so that 3% by weight of anhydrous hydrochloric acid was added to a unit weight of each copolymer to hydrolyze the copolymer at 60° C. for about 40 hours. A sample for each of the hydrolyzed products was picked up and subjected to the infrared absorption analysis from which the absorption ratio of OH/CH of each sample was calculated. The results are shown in the following Table I. To each of the hydrolyzed solutions was then added 1 part by weight of benzoyl peroxide, and the solution was thereafter maintained at 60° C. for 3 hours for decolorization. After decolorization treatment, the hydrolyzed solution was cooled to room temperature and the solution was neutralized by propylene oxide. Methanol was distilled off together with the solvent at 40° C. under a reduced pressure of 100 Torr until the total volume of the solvent and methanol is decreased to about 45% of the original volume. Whereupon, the solution of the hydrolyzed product solution containing about 1% by weight of methanol was obtained.

Properties of five samples thus treated were tested to obtain the results shown in Table I.

thane resin ("Colonate L") at the mixing ratio of 1:1 by weight. Each solution was coated on a glass plate and dried to obtain a coating film of about 70 micron thickness. This coating film was made into a No. 3 Dumbbell test specimen for subjecting to tensile test generally in accordance with the JIS K-6723 Method. The test specimen was put into an air-conditioned chamber maintained at 23° C. and 50% RH and left therein for 24 hours. The elongation percentage and tensile strength were determined by a tensile tester at the pulling rate of 100 mm/min.

(5) The dispersibility of magnetic powders were determined in the following manner: A mixture of magnetic powders and each of the coating resins [a mixture of each sample with urethane resin ("Colonate L") at 1:1 by weight] at a mixing ratio of 4 to 1 was kneaded by a ball mill for an hour and coated 1/100 inch thick on a glass plate by means of a doctor blade. The coated film

TABLE I

| Sample No. | 1 | 2 | 3 | 4 | 5 | 6 |
|---|---|---|---|---|---|---|
| VC/VAC/CVDC* (wt. %) | 87/13/0 | 80/20/0 | 75/25/0 | 70/30/0 | 75/25/5 | 53/47/0 |
| Average Polymerization Degree ($\bar{P}$) | 400 | 400 | 400 | 400 | 400 | 400 |
| HCl/Copolymer (wt/%) | 3 | 3 | 3 | 3 | 3 | 2 |
| MIBK/Tol/MeOH* (wt. ratio) | 6/2/2 | 6/2/2 | 6/2/2 | 6/2/2 | 6/2/2 | 6/2/2 |
| Temperature (°C.) | 60 | 60 | 60 | 60 | 60 | 60 |
| Concentration of Copolymer (wt. %) | 25 | 25 | 25 | 25 | 25 | 25 |
| Hydrolysis Reaction Time (hrs) | 40 | 40 | 40 | 40 | 40 | 40 |
| Infrared Absorption Ratio (OH/CH) | 0.3 | 0.5 | 0.7 | 0.8 | 0.6 | 1.0 |
| Turbidity | Slightly Cloudy | Clear | Clear | Clear | Clear | Slightly Cloudy |
| Tensile Strength (kg/cm$^2$) | 530 | 570 | 570 | 590 | 560 | 450 |
| Elongation (%) | 4.5 | 7.5 | 10.5 | 9.2 | 15.0 | 6.2 |
| Dispersibility of Magnetic Powder | Some clods observed | Dispersed uniformly | Dispersed uniformly | Dispersed uniformly | Dispersed uniformly | Many clods observed |

*Note:
Abriged notations in the Table mean the following compounds:
MIBK Methyl isobutyl ketone
VC Vinyl chloride
CVDC Vinylidene chloride
Tol Toluol
VAC Vinyl acetate In Table I, samples Nos. 1 and 6 are reference examples given for the comparison purpose. The properties of the samples set forth in Table I were determined in accordance with the following test methods.

(1) The average polymerization degree was determined in accordance with the JIS (Japanese Industrial Standard) K-6721 Method.

(2) The infrared absorption ratio of OH/CH indicative of the hydrolysis degree was determined in accordance with the following procedure. Firstly, each solution after hydrolysis was coated on a glass plate to form a coating of 30 to 50 micron thickness, and then dried to obtain a dried coating film. Using this dried coating film, the absorptions at 3450 cm$^{-1}$ due to the OH group and at 2930 cm$^{-1}$ due to the CH group were measured by means of an infrared spectrophotometer. The infrared absorption ratio of OH/CH was calculated from the measured values.

(3) Each sample was mixed with an urethane resin commercially available under the trade name of "Colonate L" produced by Nippon Polyurethane Industry Co., Ltd. at the mixing ratio of 1:1 by weight, and the turbidity of the mixture was visually observed. If the sample is miscible with the urethane resin, it gives a clear mixture. If, on the contrary, the sample is not miscible with the urethane resin, it becomes cloudy.

(4) The elongation percentage and tensile strength were determined in accordance with the following procedure. Firstly, each sample was mixed with an urewas left at room temperature for an hour and was checked as to whether or not clods of the magnetic powders were observed.

As will be apparent from the results set forth in Table I, if a vinyl chloride copolymer having an average polymerization degree of 400 is hydrolyzed such that the absorption ratio of OH/CH of the hydrolyzed product in the infrared spectrum reaches 0.5 to 0.9, the elongation percentage and the tensile strength of the coating resin containing the hydrolyzed product increase and the miscibility of the hydrolyzed product with the urethane resin is improved remarkably to give a clear mixture when mixed with the urethane resin. On the contrary, the coating resins containing Samples Nos. 1 and 6 are inferior in miscibility, tensile strength, elongation and dispersibility.

EXAMPLE 2

To the Sample No. 3 solution set forth in Table I was added methanol in an amount of five times by volume as much as that of the Sample No. 3 solution to precipitate the resin contained therein. The resin thus precipitated was separated by a centrifugal separator and then dried at 50° C. for 10 hours using an air drier.

The total volume of volatile matters contained in the dried resin was 5.6% by weight when determined in accordance with the JIS K-6721 Method. The dried resin thus obtained was dissolved in methyl isobutyl ketone and subjected to gas chromatography to determine the methanol content of the dried resin. The result showed that the methanol content was 2.8% by weight based on the weight of the hydrolyzed vinyl chloride copolymer.

The dried resin was dissolved in a mixed solvent of methyl isobutyl ketone and toluol, the mixing ratio of methyl isobutyl ketone to toluol being 1 to 1 by weight, and then added with a urethane resin ("Colonate L") so that the ratio by weight of the dried resin to the urethane resin was 1 to 1. The solution was clear when observed visually. The coating film was formed from the solution and the properties of the thus formed coating film were determined similarly as in Example 1. Equivalent results were obtained and the elongation percentage of the coating film was 10%.

EXAMPLE 3

The same procedures were repeated as in Example 1 using vinyl chloride/vinyl propionate copolymer under the conditions as set forth in Table II. The properties of a coating resin obtained by mixing the hydrolyzed product with a urethane resin ("Colonate L") at a mixing ratio of 1:1 by weight were determined similarly as described in Example 1.

TABLE II

| | |
|---|---|
| Vinyl chloride/Vinyl propionate (wt. %) | 70/30 |
| Average Polymerization Degree (P) | 400 |
| Hydrochloric acid/Copolymer (wt %) | 2 |
| Solvent | |
| Methyl isobutyl ketone/Toluol/MeOH (wt. ratio) | 6/2/2 |
| Temperature (°C.) | 70 |
| Copolymer Concentration (wt %) | 25 |
| Hydrolysis Reaction Time (hrs) | 50 |
| Infrared Absorption Ratio (OH/CH) | 0.7 |
| Turbidity | Clear |
| Tensile Strength (kg/cm$^2$) | 550 |
| Elongation (%) | 11 |
| Dispersibility of Magnetic Powder | Uniformly dispersed |

For the purpose of comparison, a hydrolyzed vinyl chloride copolymer commercially available under the trade name "Vinylite Resin VAGH" produced by Union Carbide Corporation was mixed with a urethane resin ("Colonate L") at a mixing ratio of 1:1 by weight and the mixed coating resin was subjected to various experimental tests as set forth in Example 1. The procedures similar to Example 1 were also effected with respect to vinyl chloride/vinyl acetate copolymer to obtain a hydrolyzed product. Mixing the hydrolyzed product with a urethane resin ("Colonate L") at a mixing ratio of 1:1 by weight, a coating resin was obtained, which was subjected to tests as described in Example 1. The results are shown in Table III.

TABLE III

| Copolymer | Vinyl chloride/Vinyl acetate/Vinyl alcohol | Vinyl chloride/Vinyl acetate |
|---|---|---|
| Composition (wt %) | 91/3/6 | 45/55 |
| Average Polymerization Degree (P̄) | 440 | 400 |
| Hydrochloride acid/Copolymer (wt %) | — | 2 |
| Solvent | | |
| Methyl isobutyl ketone/Toluol/MeOH (wt. ratio) | — | 6/2/2 |
| Hydrolysis Reaction Temperature (°C.) | — | 60 |
| Copolymer Concentration (wt %) | — | 25 |
| Hydrolysis Time (hr) | — | 30 |
| Infrared Absorption Ratio (OH/CH) | 0.3 | Impossible to determine |
| Turbidity | Cloudy | Much cloudy |
| Tensile Strength (kg/cm$^2$) | 560 | 410 |
| Elongation (%) | 4.5 | 8.3 |
| Dispersibility of Magnetic Powder | Some clods observed | Many clods observed |

The advantages of the thermoplastic resin according to the present invention may be summarized as follows:
(1) The miscibility or chemical affinity thereof with a thermosetting resin is improved.
(2) The coating is tough when coated on a base film.
(3) The elongation percentage of the coating is increased to strengthen the covering power of the coating resin.
(4) Magnetic powders can be uniformly dispersed in the coating resin to give a magnetic recording tape excellent in reproducing power in high-frequency zone.
(5) In the way of preparation, a solution of the thermoplastic resin is obtained, which may be used only by adding the same to the thermosetting resin.

Although the present invention has been described with reference to examples, various modifications and variations can be made without departing from the spirit of the invention. It is intended that all these modifications and variations be included.

What is claimed is:
1. A process for preparing a thermoplastic resin for use in a coating resin to be coated on a base film of a magnetic recording tape which comprises the steps of:
(a) copolymerizing 50 to 80% by weight of a vinyl chloride monomer, 20 to 40% by weight of a vinyl ester monomer and 0 to 15% by weight of a comonomer polymerizable with the vinyl chloride monomer to obtain a vinyl chloride copolymer having an average polymerization degree of 200 to 800;
(b) hydrolyzing said vinyl chloride copolymer dissolved in a solvent in the presence of an alcohol until the absorption ratio of OH/CH of the hydrolyzed product in the infrared absorption spectrum reaches 0.5 to 0.9;
(c) decoloring the hydrolyzed product;
(d) cooling and neutralizing with an organic oxide the solution containing the hydrolyzed product of said vinyl chloride copolymer, said organic oxide being selected from the group consisting of propylene oxide and butylene oxide; and
(e) removing the alcohol by distillation at a temperature of 40° C. to 70° C. under a reduced pressure of 50 to 200 Torr until the content of said alcohol in the solution reaches less than 1% by weight, whereby to obtain the hydrolyzed product in the form of a solution.

2. A process according to claim 1, wherein said vinyl ester monomer is a vinyl ester of an alkyl carboxylic acid, said acid having 2 or more carbon atoms.

3. A process according to claim 2, wherein said vinyl ester monomer is selected from the group consisting of vinyl acetate and vinyl propionate.

4. A process according to claim 1, wherein said comonomer is selected from the group consisting of methacrylic acid and esters thereof, acrylic acid and esters thereof, maleic acid, fumaric acid, acrylonitrile, vinylidene chloride and α-olefins having 2 to 9 carbon atoms.

5. A process according to claim 1, wherein said alcohol used in the hydrolyzing step is selected from the group consisting of methyl alcohol, ethyl alcohol and butyl alcohol.

6. A process according to claim 5, wherein an acid catalyst is used at the hydrolyzing step.

7. A process according to claim 6, wherein said acid catalyst is selected from the group consisting of hydrochloric acid, sulfuric acid and phosphoric acid.

8. A process according to claim 7, wherein said acid catalyst is hydrochloric acid and is added such that the quantity of the hydrochloric acid in a pure state ranges about 2 to 5 parts by weight based on 100 parts by weight of the vinyl chloride copolymer.

9. A process according to claim 1, wherein the hydrolyzing step is effected at a temperature of 40° C. to 70° C.

10. A process according to claim 1, wherein the hydrolyzed product is decolored by adding 1 to 2 parts by weight of an organic peroxide to the solution containing 100 parts by weight of the hydrolyzed product and maintaining the solution at 40° C. to 70° C. for 3 to 4 hours.

11. A process according to claim 10, wherein the organic peroxide is benzoyl peroxide.

* * * * *